(12) United States Patent
Leahy et al.

(10) Patent No.: US 8,567,347 B2
(45) Date of Patent: Oct. 29, 2013

(54) PET COOLING BED

(71) Applicants: Kenneth H. Leahy, Atlanta, GA (US);
Mark H. Raeside, Atlanta, GA (US)

(72) Inventors: Kenneth H. Leahy, Atlanta, GA (US);
Mark H. Raeside, Atlanta, GA (US)

(73) Assignee: LayRay, LLC, Atlanta, GA (US)

( * ) Notice: Subject to any disclaimer, the term of this patent is extended or adjusted under 35 U.S.C. 154(b) by 0 days.

(21) Appl. No.: 13/671,175

(22) Filed: Nov. 7, 2012

(65) Prior Publication Data

US 2013/0061808 A1   Mar. 14, 2013

Related U.S. Application Data

(63) Continuation-in-part of application No. 12/939,232, filed on Nov. 4, 2010, now abandoned.

(51) Int. Cl.
*A01K 1/015* (2006.01)

(52) U.S. Cl.
USPC .......................................... 119/28.5; 119/526

(58) Field of Classification Search
USPC ............. 119/28.5, 525, 526; 5/419, 420, 654, 5/655.5; 62/261
See application file for complete search history.

(56) References Cited

U.S. PATENT DOCUMENTS

| | | | | |
|---|---|---|---|---|
| 3,858,410 A * | 1/1975 | Drake | ............................ | 62/458 |
| 3,922,879 A * | 12/1975 | Arnold | ............................ | 62/458 |
| 4,060,276 A * | 11/1977 | Lindsay | ................... | 297/180.11 |
| 4,064,835 A * | 12/1977 | Rabenbauer | ................. | 119/28.5 |
| 4,691,664 A * | 9/1987 | Crowell | ...................... | 119/61.52 |
| 4,899,693 A * | 2/1990 | Arnold | ......................... | 119/28.5 |
| 5,632,051 A * | 5/1997 | Stanley et al. | ................... | 5/636 |
| 5,784,995 A * | 7/1998 | Willinger | ..................... | 119/28.5 |
| 5,916,088 A * | 6/1999 | Gueli | ................. | 5/639 |
| 6,061,856 A * | 5/2000 | Hoffmann | ......................... | 5/728 |
| 6,237,531 B1* | 5/2001 | Peeples et al. | ............... | 119/28.5 |
| 6,243,893 B1* | 6/2001 | Baldwin | ........................... | 5/422 |
| 6,516,624 B1* | 2/2003 | Ichigaya | ..................... | 62/259.3 |
| 6,553,935 B1* | 4/2003 | Penner | ......................... | 119/28.5 |
| 6,708,646 B1* | 3/2004 | Wang | .......................... | 119/28.5 |
| 6,923,144 B2* | 8/2005 | Little | .......................... | 119/482 |
| 6,935,273 B2* | 8/2005 | Throndsen et al. | .......... | 119/431 |
| 7,117,816 B2* | 10/2006 | Behnke et al. | ............... | 119/28.5 |
| 7,322,314 B1* | 1/2008 | Sweeney | ....................... | 119/483 |
| 7,669,552 B2* | 3/2010 | Arvanites | .................... | 119/28.5 |
| 7,730,740 B2* | 6/2010 | Keller | ............................. | 62/459 |
| 7,913,648 B2* | 3/2011 | Maeda | ........................ | 119/61.52 |
| 8,291,866 B2* | 10/2012 | Cauchy et al. | ............... | 119/500 |
| 2003/0115670 A1* | 6/2003 | Antinoro | ........................... | 5/420 |
| 2008/0022935 A1* | 1/2008 | Fine | ............................. | 119/28.5 |
| 2012/0167607 A1* | 7/2012 | Callender | ................... | 62/259.3 |

* cited by examiner

*Primary Examiner* — Yvonne Abbott
(74) *Attorney, Agent, or Firm* — Angela H. Smith

(57) ABSTRACT

A thermodynamic pet cooling station that uses conductive properties to transfer cold temperatures from a cooling element contained within an insulated base to the surface of a platform tile, creating an efficiently cooled area where an animal my rest when he/she is subjected to dangerously hot weather. The pet cooling station is thermodynamically cooled using three integral components: a molded insulated base, structural platform tiles made from a conductive metal comprised of a planar surface with temperature-transfer cases affixed to their underside, and cooling pods, that can be pre-frozen and are reusable, containing a non-toxic liquid that is housed in either a similar conductive metal or a durable membrane that will hold its shape and efficiently transfer the frozen temperature to the temperature-transfer cases allowing thermodynamics to follow the specific pathway of interconnected metal and move the cold temperature up and across the structural platform planar surface in an efficient manner. Once the frozen cooling pods are inserted into the temperature-transfer cases, and the structural tiles are lowered into the insulated base, the unit creates several hours of an efficiently cooled surface for the animal to enjoy without any human intervention.

3 Claims, 9 Drawing Sheets

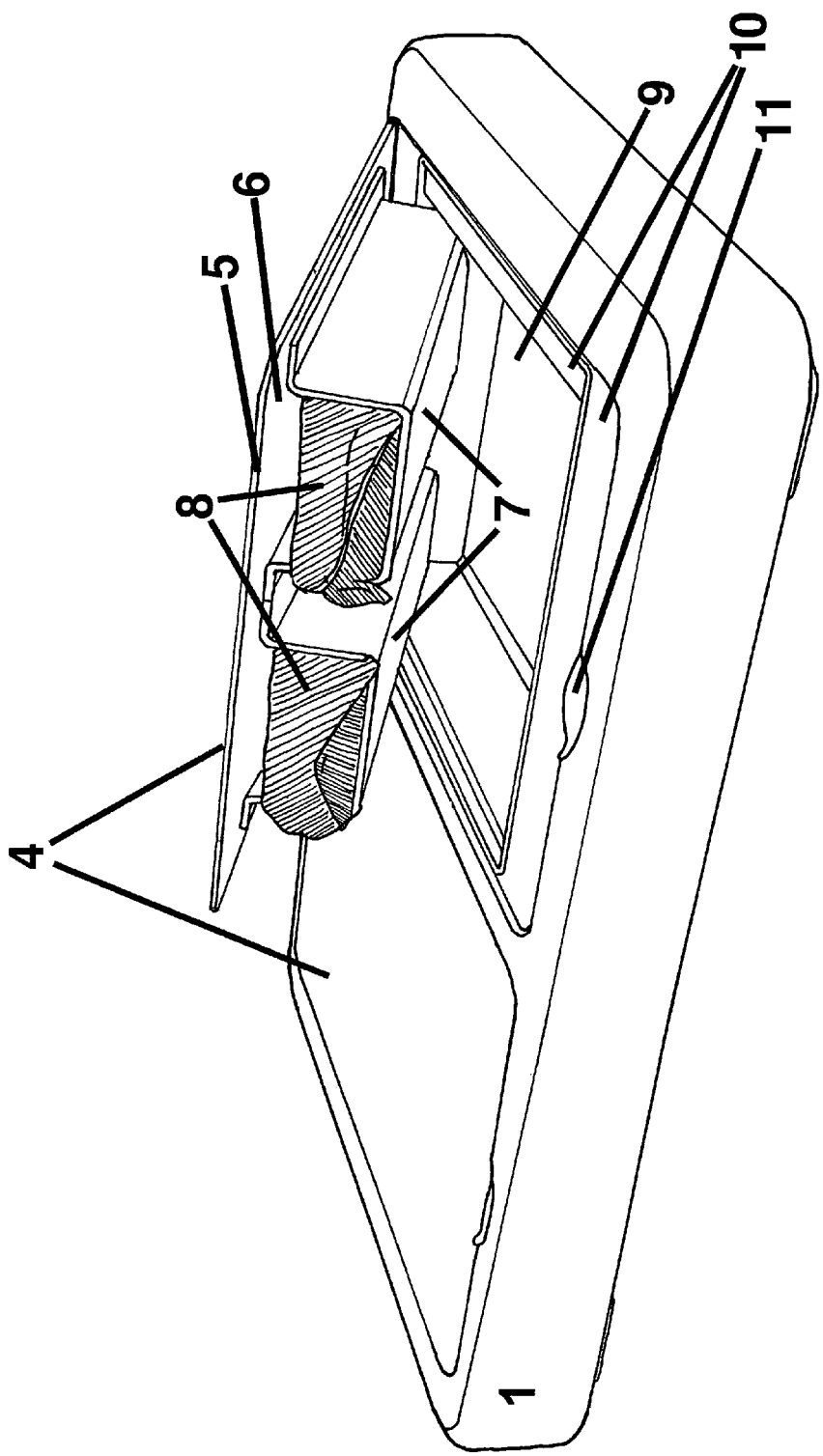

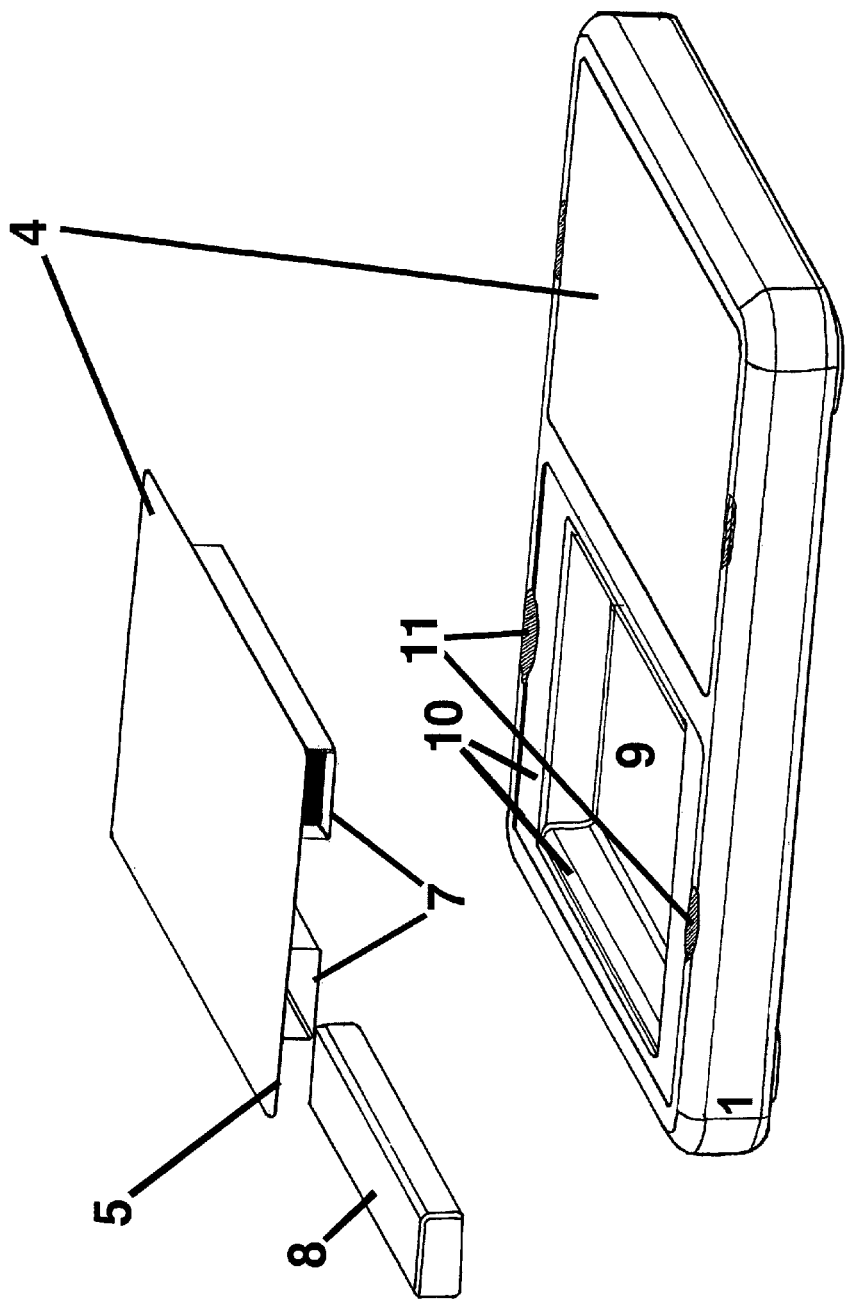

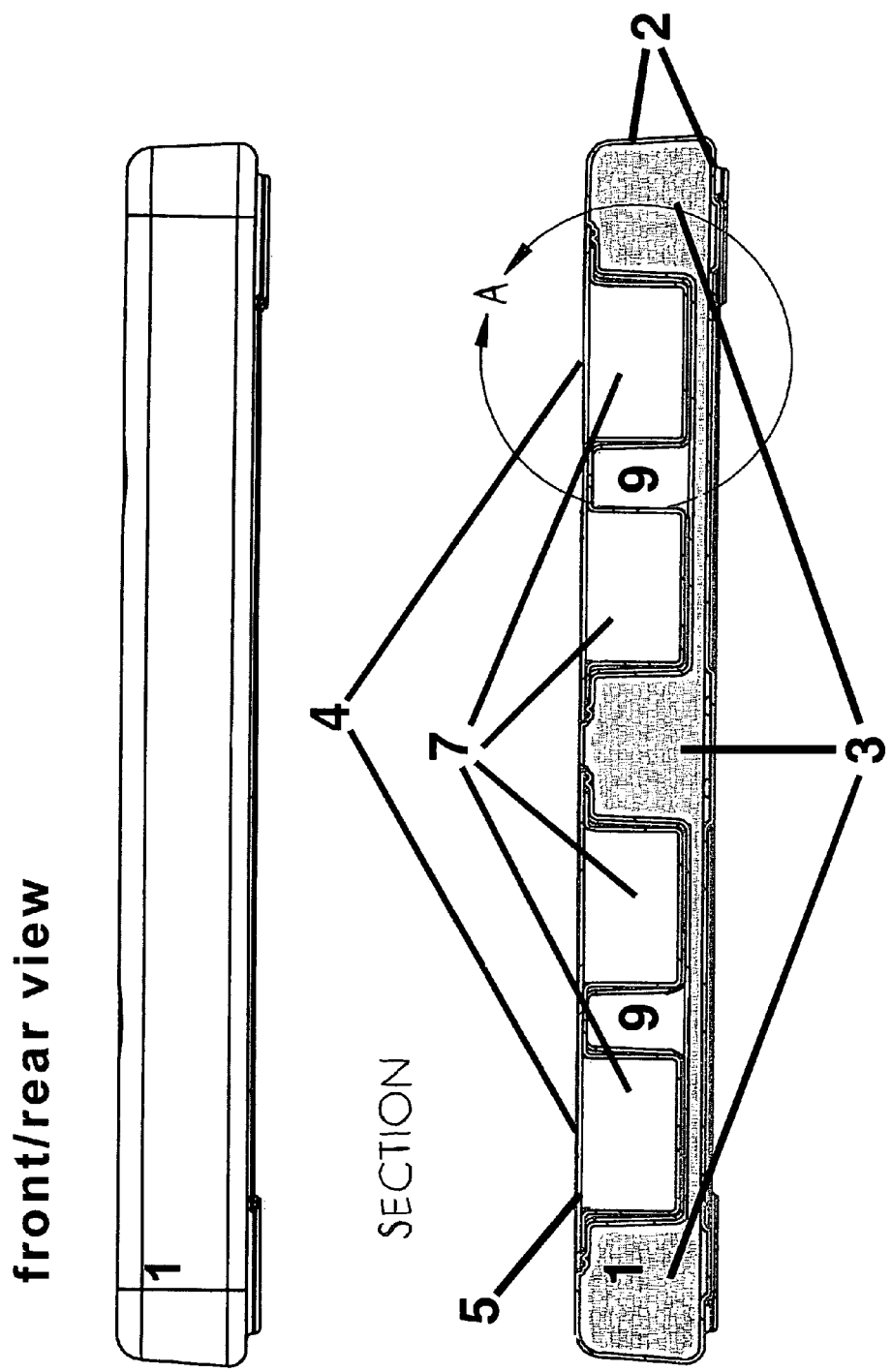

DETAIL A

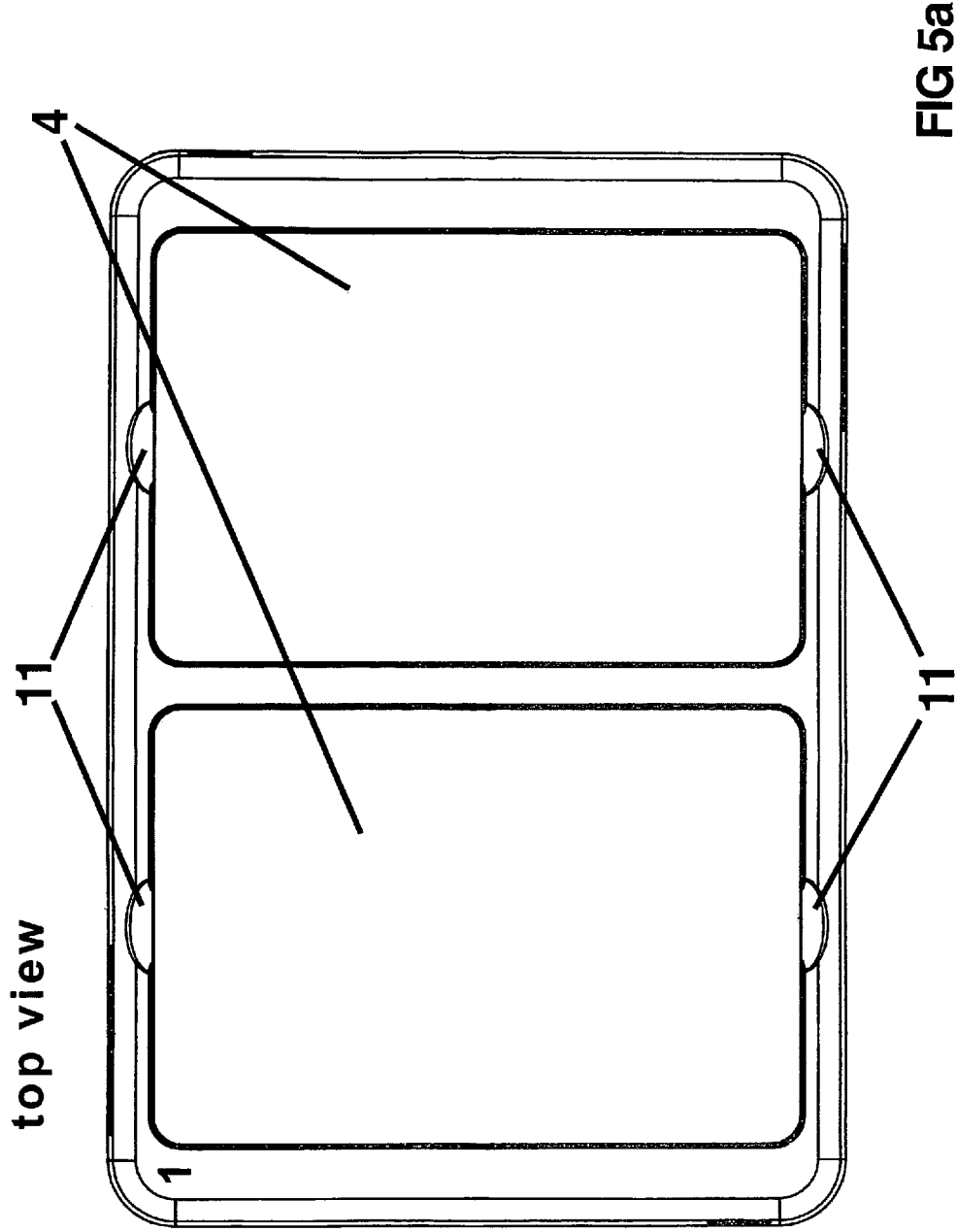

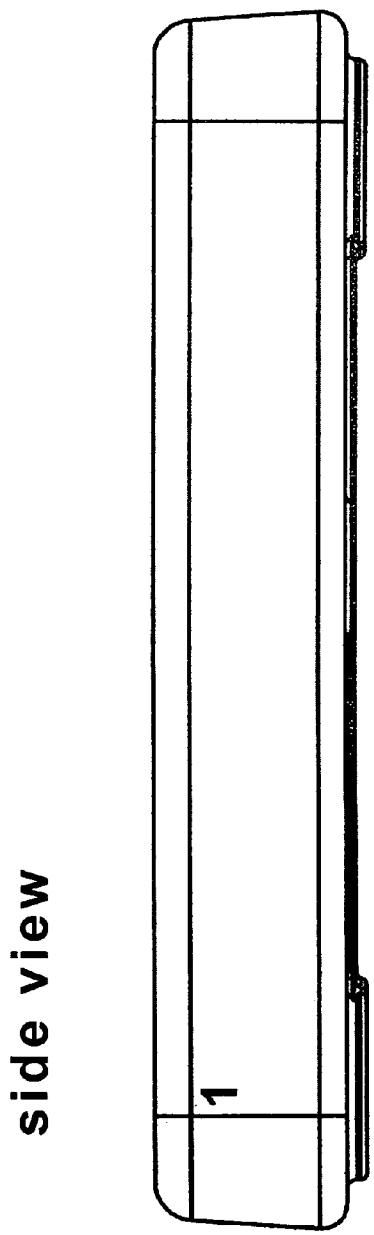

front/rear view

PET COOLING BED

| US Patent References Cited (*=closest prior art) |
| --- |
| U.S. Pat. No. 4,064,835 |
| U.S. Pat. No. 4,899,693* |
| U.S. Pat. No. 5,632,051 |
| U.S. Pat. No. 6,237,531 |
| U.S. Pat. No. 6,553,935 |
| U.S. Pat. No. 7,669,552 B2 |
| U.S. Pat. No. 7,117,816 B2 |
| U.S. Pat. No. 6,243,893 |
| U.S. Pat. No. 6,061,856 |

BACKGROUND OF THE INVENTION

1. Field of the Invention

This invention is an advancement in pet cooling products, and, more particularly, is a simple and effective thermodynamic pet cooling station, using key conductive, structural, and insulator materials to transfer temperature from a cold source to a platform surface, for the purpose of helping animals such as canines and cats cool off when they are subjected to uncomfortably high temperatures both outdoors and indoors.

2. Description of Related Art

While there are countless pet products in existence, the field of temperature-regulating products is limited. Possibly the least technically advanced method, but also the most well known, is to simply provide a bag of ice for the pet to lie on or near. Various examples of cooling pet devices are evidenced in the prior art. U.S. Pat. No. 4,064,835, discloses an air-conditioned pet product wherein a portable unit is provided with an insulated bottom portion containing chemical ice-packs and a top portion which fits over the bottom portion and has a planar, perforated surface to provide an area for a pet to recline and prevent direct contact with the ice-packs, thereby providing cooling of the pet through the perforations in the top portion. U.S. Pat. No. 4,899,693, discloses a cooled portable pet bed which has a base with a central recess dimensioned to receive a container having a sealable opening for the insertion of ice cubes; an open weave fabric mattress covers the upper surface of the container to form a cooled mattress for a pet; a removable carrying strap allows the container to be utilized as a canteen for drinking water; the container may be formed from a rigid or durable flexible material. U.S. Pat. No. 6,553,935, discloses a pet air bed that includes a plastic housing having a base portion and an elevated pet support portion connected by a hinge to the base portion and having a number of air flow holes provided through pet support and/or pet adjacent surfaces thereof; a fan assembly being connected to the plastic housing in a manner such that air flow from the exterior of the plastic housing is generated into a cavity within the plastic housing in a manner to cause air to flow out through the air flow holes in the elevated pet support portion; the cavity formed within the plastic housing is provided for positioning cooling or heating elements such that the pet may have a temperature controlled pet bed; a forward section of the plastic housing including clips for holding a name tag or other pet identifying type of plate.

While the above prior art all share the same intent of cooling a pet, none of them demonstrate the unique thermodynamic quality of the current invention. The '835 patent is less desirable in that it relies on cooled air from chemical ice packs to rise through a perforated surface. While the animal's body heat might fall through the perforated surface, the cooled air would fall and not rise to create the intended "air conditioned" feel. It relies on proximity to the cold source, and provides no means to draw cold temperature towards the desired surface area, nor does it enable the variation of temperature and placement. Furthermore, the planar top described provides little/no structural integrity to support the weight of a pet. The '693 patent is significantly dissimilar in that it requires the animal to lie directly on the cooling source, and again provides no means of temperature regulation or placement of said temperature. Because the cooling surface also doubles as a canteen for human and animal consumption, it is clear that the art would have to be limited in size and would only accommodate the smallest of animals. A medium sized dog would require a large "cooling canteen" that would require several pounds of ice that would then have to be inserted into the chamber. This process is unrealistic and very inefficient. The '935 patent, while arguably functional, shares only the fact that his art is a cooling pet bed. The '935 patent is based on an electric fan blowing heated or cooled air onto the animal with no explanation of the heating/cooling element.

In U.S. Pat. No. 6,243,893, a water-cooled mattress for babies/infants that comprises two stacked bladders that are connected to each other with a space, or "pocket", between the upper and lower bladders is taught. The bottom bladder is essentially an "air mattress" meant to be inflated and thereby creating the support for the unit. The top bladder is essentially a "water bed" meant to be filled with water to create a soft surface for a baby to rest upon. The space, or "pocket", between the lower air mattress and the upper waterbed is able to receive either heating or cooling packs. The packs are insulated from the resting surface by the water, and the water-filled bladder will absorb the energy of hot/cold keeping the true temperature away from anyone resting above. Water is an insulator in this scenario, and will create a pleasant ambient cooling effect desirable to a human. Current invention differs from this invention in several important ways. First, conductive/structural platform tile of the current invention is designed to directly touch the cold element in a large flat area, then thermodynamically transfer the temperature up and across the entire aluminum surface. Second, in the current invention there are no insulators between the frozen packs and the aluminum conductor—the aluminum is the intended resting surface. Third, the current invention's conductive/structural platform tile design is integral to the functionality of our invention. The platform is specifically formed to be structurally stable, giving rigidity unlike any water or air-filled mattress could deliver. Furthermore, the specific design of the descending walls of the conductive/structural platform tile's temperature-transfer cases rest on the bottom of the insulated base and provide substantial support.

In U.S. Pat. No. 6,061,856, what is taught is a clamshell hinged version of a traditional bed-like mattress that, when opened, reveals voids intended to hold a variety of cylindrical inserts. These inserts are designed to change the contour and/or rigidity of the resting surface, and the user can achieve different surface contours depending on the insertion of hard, hollow, or grooved inserts. In col 2, line 48-52 of '856, an upper and lower base unit to be made of a polymeric material such as polyurethane or latex, or natural materials such as wool as he was intending to describe a mattress are described. In col 2, line 53-55 of '856, the contouring inserts of the mattress are described as being either solid foam/latex, or hollow, or inflatable all intended to change the contour and/or rigidity of the resting surface in multiple ways. The current invention differs from '856 in several important ways. First, the upper and lower portions of the '856 mattress are joined by a hinge, and therefore dependent on each other to form one unit. The components of the current invention are not hinged or connected in any way. Second, the upper and lower portions of the '856 unit are made from the same material, and are intended to create a clamshell mattress. The current invention's upper and lower components are independent, made of completely different materials, and serve different functions when paired together. Third, unlike the soft mattress with adjustable contours and/or rigidity that are specifically placed in the '856 mattress, the current invention seeks to create a single-plane, flat/level resting surface that has no change in contour and maintains consistent rigidity while it thermodynamically transfers temperature across its surface. Fourth, the current inventions conductive/structural platform tile design is the key to the functionality of the device. Differing from '856's take on the traditional soft mattress, the current invention's conductive surface, in the preferred embodiment that surface being aluminum, is designed to be structurally stable, providing rigidity that cannot be found in a traditional fabric/polymeric mattress. Furthermore, the specific design of the descending walls of the conductive/structural platform tile's chambers rest on the bottom of the insulated base and provide significant weight support and stability.

Based on the prior art discussed above, it is clear that there have been attempts to satisfy the ongoing need of keeping an animal safe and cool when subjected to environments with uncomfortably high temperatures, as well as attempts to manipulate the traditional human mattress. It is also clear, that because today's current market lacks any product similar to the '835 and '693 patents mentioned above, their devices did not sufficiently satisfy the pet market need. It should be appreciated that the invention in this application has been tested and solves the problem effectively, efficiently, economically and requires little human interaction and no direct electricity.

BRIEF SUMMARY OF THE INVENTION

This invention represents an advancement in the area of pet products, specifically those designed to provide a temperature-controlled resting spot. The invention uses conductive properties to transfer cold temperatures from a cooling element contained in the insulated base of the invention to the surface of the platform, comprised of a key conductive and structural material whereupon the pet may rest. In taking into consideration the previously discussed inherent disadvantages in the known prior art, the invention is a significant advancement in pet cooling products. By using thermodynamics, this device effectively transfers the cold temperature from a small cooling source to, and across, a conductive/structural platform tile surface for the animal user to lay on. This cooling platform solves the immediate need of a pet owner by providing a cool, safe and comfortable surface for pets without any of the disadvantages previously noted. Furthermore, the pet owner is able to control both the temperature range and placement of said temperatures as desired to meet the animal's specific needs. The pet owner can regulate the temperature range achieved on the platform surface by adding-to or subtracting-from the amount of cooling source loaded into the temperature-transfer cases on the underside of the conductive/structural platform tiles. The placement of the desired temperatures felt on the tiles can be achieved/varied by choosing which position/location of the temperature-transfer cases is used to hold the cooling source. The true nature and function of the current invention is more specifically detailed below and with subsequent illustrations.

The current invention consists of three elements: 1) A low profile, molded, insulated base with the interior and exterior walls being made from materials such as, but not limited to, rigid plastic or resin material. The insulated base is hollow. The hollow section of the insulated base is filled with an insulating material, such as, but not limited to, foam. The design details of this insulated base are integral in providing structural integrity and efficient insulation. These details include the bi-level tile ledges for alignment, the main insulating compartment for insulation of the temperature-transfer cases, and the finger recesses for access. They allow for exact alignment, pivoting, and removal of the conductive/structural platform tiles. 2) One or more non-slip conductive/structural platform tiles, made of a key conductive and structural material like, but not limited to, aluminum. These conductive/structural platform tiles consist of a flat surface with descending temperature-transfer cases, made from the same conductive and structural material, that are welded/molded to the underside of said surface that drop into the insulated base when closed. The specific "upside-down-hat" shape and flanges of the descending temperature-transfer cases serve to reinforce the underside of the flat surface when the tile is lowered into the insulating compartments within the insulated base, thereby creating the incredible strength and support of the entire conductive/structural platform tile(s), allowing the pet cooling station to support significant weight. Most importantly, this "upside-down-hat" shape of the temperature-transfer cases uses its horizontal flanges to facilitate the temperature-transfer necessary to allow a relatively small cooling source to cool the significantly larger surface area of the conductive/structural platform tile. In the current invention, the conductive surface of the conductive/structural platform tile consists of powder-coated aluminum and functions extremely well for thermodynamic transfer, however it should be clear that any material with the similar conductive properties of aluminum could be used. It is important to note that the conductive/structural platform tiles are not connected to the insulated base by any hinges or hardware, and they merely pivot up/down within a specific bi-level tile ledge designed into the insulated base. Additionally, using the integrated finger recesses, the conductive/structural platform tiles may be lifted out of the insulated base, to provide access to the temperature-transfer case area on the underside for loading/unloading the cooling elements. 3) Cooling pods designed to fit within the exact shape of the aforementioned temperature-transfer cases in the conductive/structural platform tiles, being inserted into the openings of the temperature-transfer cases that are exposed when the forward edge of the conductive/structural platform tiles are lifted using the finger-lift recesses at the forward edge of the temperature transfer case, consisting of containers filled with a non-toxic liquid and foam, for shape, that can be frozen in a residential freezer. The cooling pods can be housed in a similar conductive material as the conductive/structural platform tile or any thin, durable membrane with contents that could be re-frozen, maintain cold for long periods, hold its shape and easily transfer the frozen temperatures through its surface to the temperature-transfer cases.

As previously noted in the abstract, once the cooling pods are inserted into the temperature-transfer cases, and the conductive/structural platform tiles are placed into the insulated base, the above components conduct cold directly up to/across the conductive/structural platform tiles by means of a continuous path of contact and uninterrupted thermodynamic-flow to create the desired temperature, thereby providing several hours of an efficiently cooled surface for the animal to enjoy without any additional human intervention.

Furthermore, variable temperature-range and temperature-position is easily achieved on the surface by adding/subtracting cooling elements, and by changing the position of said cooling elements within the temperature-transfer cases. Together, the three elements mentioned above are all integral components in creating the pet cooling station.

The invention is, in its most basic terms, as one skilled in the art will recognize, a mechanism for cooling a conductive surface through a temperature-transfer from a cooled substance to the platform surface and maintaining the cool surface for hours. The embodiments described herein are not the sole mechanisms for achieving the goals of the invention. The features described in the claims, as well as the language used throughout the specification, are not to be considered as limiting, but as including equivalent mechanisms within the scope of the current invention.

It is the intent of the current invention to provide a new and improved pet cooling Station that specifically uses thermodynamics to control and position cold temperatures across a flat surface, and shares only its intent and a few similar components with its predecessors.

It is also the intent of the current invention to provide a device that can sufficiently provide a cool surface for an animal to lay for many hours by simply inserting the desired/required frozen pods and thus needing no further human interaction, no batteries and no electricity, while being efficient enough to only require a limited amount of cooling pods that can be frozen daily in a residential freezer.

It is further the intent of the current invention to provide an economical, yet well constructed, product that is completely modular using no connected hinges or hardware, thereby making it easily portable by simple breakdown of components.

The current invention intends for the insulated base to be completely waterproof in order to accommodate any condensation or water if the owner decides to use ice in lieu of the aforementioned cooling pods. It should be noted that the insulated base could have plugged drain holes that, when opened would easily eliminate any water or could even provide drinking water for the animal if so desired.

The current invention is also intended to be fully functional at a variety of sizes that would comfortably accommodate various sized animals. The designs would be the same; however the size and necessary number of conductive/structural platform tiles, and associated temperature-transfer cases, would vary in order to efficiently cool the different sized surfaces.

The current invention further intends to be designed to accommodate various accessories that may improve the current product. Some of which may be, but are in no way limited to, removable slip covers for the tiles that would not impede the cooling effect of the conductive/structural platform tiles; molded base protectors that could be produced in a variety of designs to personalize the current invention; and clip-on water dishes to take advantage of melting drinking water if ice is being used in lieu of the aforementioned cooling pods.

The details described thus far, along with various more specific design elements of the current invention can be more fully understood with the accompanied drawings and more precisely described within the preferred embodiment of the invention.

BRIEF DESCRIPTION OF THE DRAWINGS

FIG. 1 is a front-side perspective of the pet cooling station showing a single conductive/structural platform tile raised on its axis point disclosing the cooling pods inserted into the temperature-transfer cases, and the inner details of the insulated base.

FIG. 2 is a front-side exploded view of the pet cooling station showing the integral components and details of the current invention.

FIGS. 3 & 3(a) shows a section view of the current invention cut lengthwise detailing how the conductive/structural platform tiles fit into the insulating compartments and bi-level tile ledges integrated into the insulated base. The FIG. 3(a) shows a detail of the circled area.

Figure 3A:
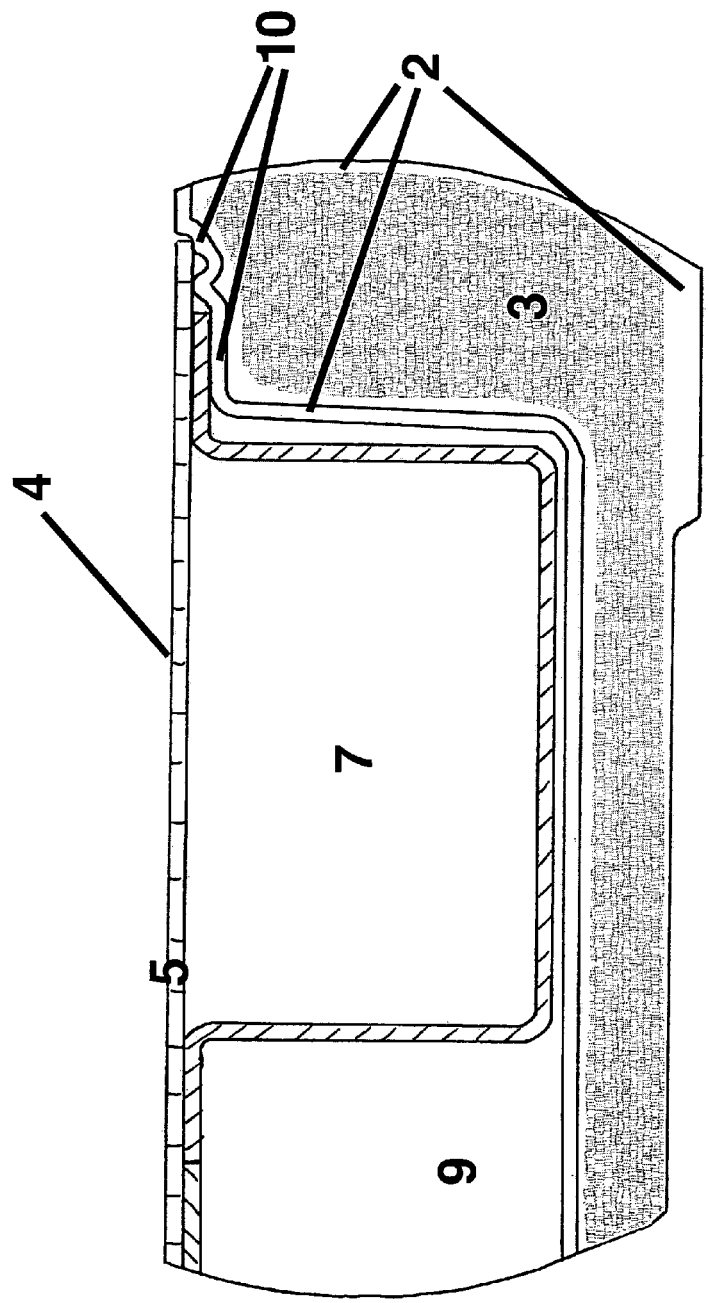

| Reference Numbers in Drawings | |
|---|---|
| 1 | Insulated Base |
| 2 | Walls of the Insulated Base |
| 3 | Insulating Substance |
| 4 | Conductive/Structural Platform Tiles |
| 5 | Forward Edge of a Temperature-Transfer Case |
| 6 | Underside of a Platform Tile |
| 7 | Temperature-Transfer Cases (integrated into Platform Tile) |
| 8 | Cooling Pods |
| 9 | Insulating Compartments (integrated into Insulated Base) |
| 10 | Bi-Level Tile Ledges (integrated into Insulated Base) |
| 11 | Finger-Lift Recesses (integrated into Insulated Base) |

DETAILED DESCRIPTION OF THE INVENTION

FIG. 1 shows a front-side perspective of the preferred embodiment of the invention, more specifically disclosing one conductive/structural platform tile (4) seated into the insulating compartment (9) integrated into the insulated base (1), and a second conductive/structural platform tile (4) opened by pivoting on the axis point created by the edge of the conductive/structural platform tile (4) and the bi-level tile ledge (10) integrated into the insulated base (1). The opened conductive/structural platform tile (4) also discloses one of the insulating compartments (9) present in the insulated base (1) used to house the temperature-transfer cases (7) and insulate the cooling pods (8) which are inserted via the opening proximate to the forward edge (5) of the temperature-transfer case (7) when the conductive/structural platform tile (4) is lowered into the bi-level tile ledges (10) utilizing the finger-lift recess (11). The illustration also shows how the temperature-transfer cases (7) being attached to the underside (6) of the conductive/structural platform tiles (4) being fully boxed with an opening proximate to the forward edge (5) which could receive ice in either block or cube form if the user chooses to not use the provided cooling pods (8).

FIG. 2 shows a front-side exploded view of the preferred embodiment of the invention, more specifically disclosing the integral components and details which include the insulated base (1) with integrated insulating compartments (9), bi-level tile ledges (10), and finger-lift recesses (11) allowing the insulated base (1) to accept the lowered conductive/structural platform tiles (4) with the temperature-transfer cases (7). FIG. 2 further shows an additional view which demonstrates the manner in which the cooling pods (9) are inserted into the temperature-transfer cases (7), as well as illustrating that the conductive/structural platform tiles (4) fit flush into the bi-level tile ledges (10) of the insulated base (1). Lastly, FIG. 2 discloses the modularity of the invention with each component being untethered and easily removable for portability and cleaning purposes.

FIGS. 3 & 3(a) shows a section view cut length wise of the preferred embodiment of the invention and details the specific engineering of the unit for its efficiency and strength. The insulated base (1) contains a hollow area formed by interior and exterior walls (2) said hollow area being sufficient to encase an insulating substance (3). The conductive/structural platform tiles (4) seated into the bi-level tile ledges (10), fit flush with the upper surface of the insulated base (1). FIG. 3 also illustrates how the insulating compartments (9), integrated into the insulated base (1), accepts the temperature-transfer cases (7), and not only create an insulated environment for keeping the cooling pods cold, but also working together create an extremely strong unit capable of accepting a large amount of weight. FIG. 3(a) represents a detail of the circled area to further illustrate the precise engineering of the invention.

Figure 4:
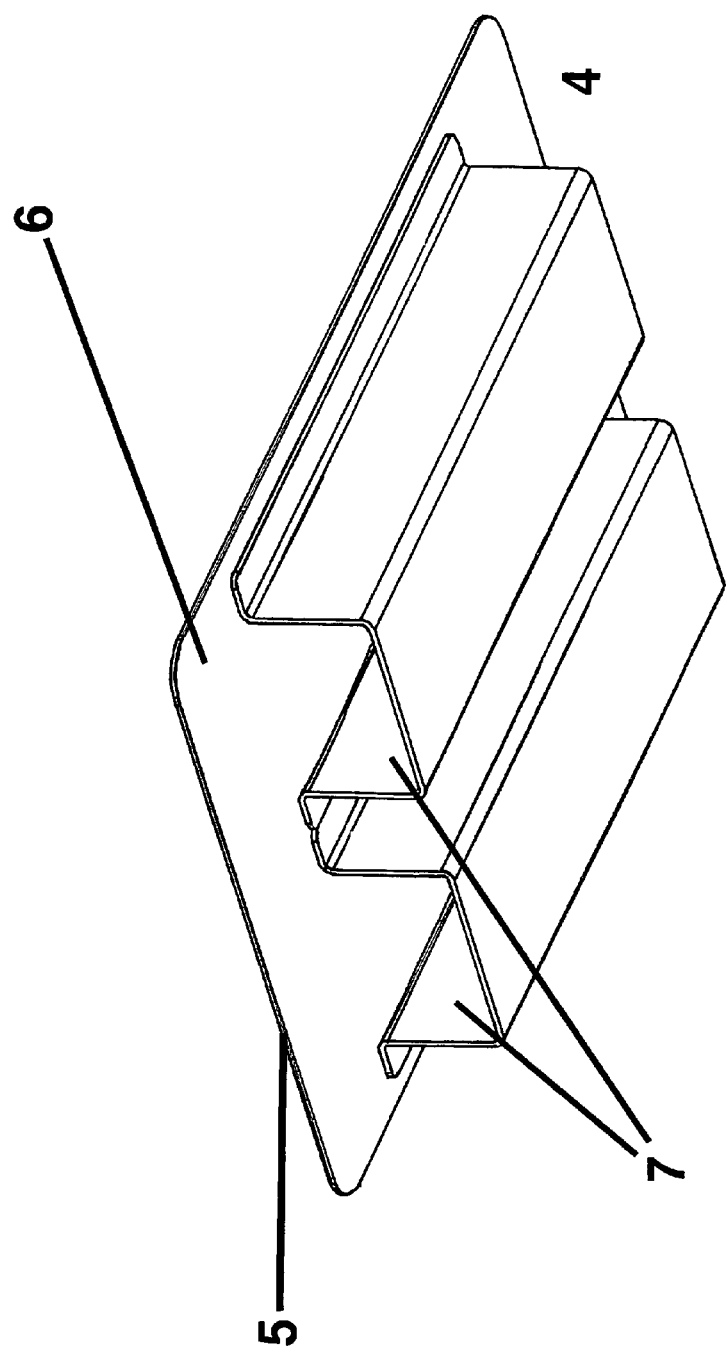
FIG. 4 shows a detailed underside perspective of a conductive/structural platform tile disclosing the temperature-transfer cases.

FIG. 4 shows a perspective from the underside (6) of the conductive/structural platform tile (4), demonstrating how the temperature-transfer cases (7) are attached to the undersurface of the conductive/structural platform tile (4), and thus creating a case for the cooling pods granting access to the temperature-transfer case opening (7) when the forward edge (5) is lifted. The cold temperatures of the inserted cooling pods are absorbed into the bottom surface of the temperature-transfer cases (7) and subsequently radiated up the sides of the temperature-transfer cases (7) and ultimately over the entire conductive/structural platform tile (4).

Figure 5B:
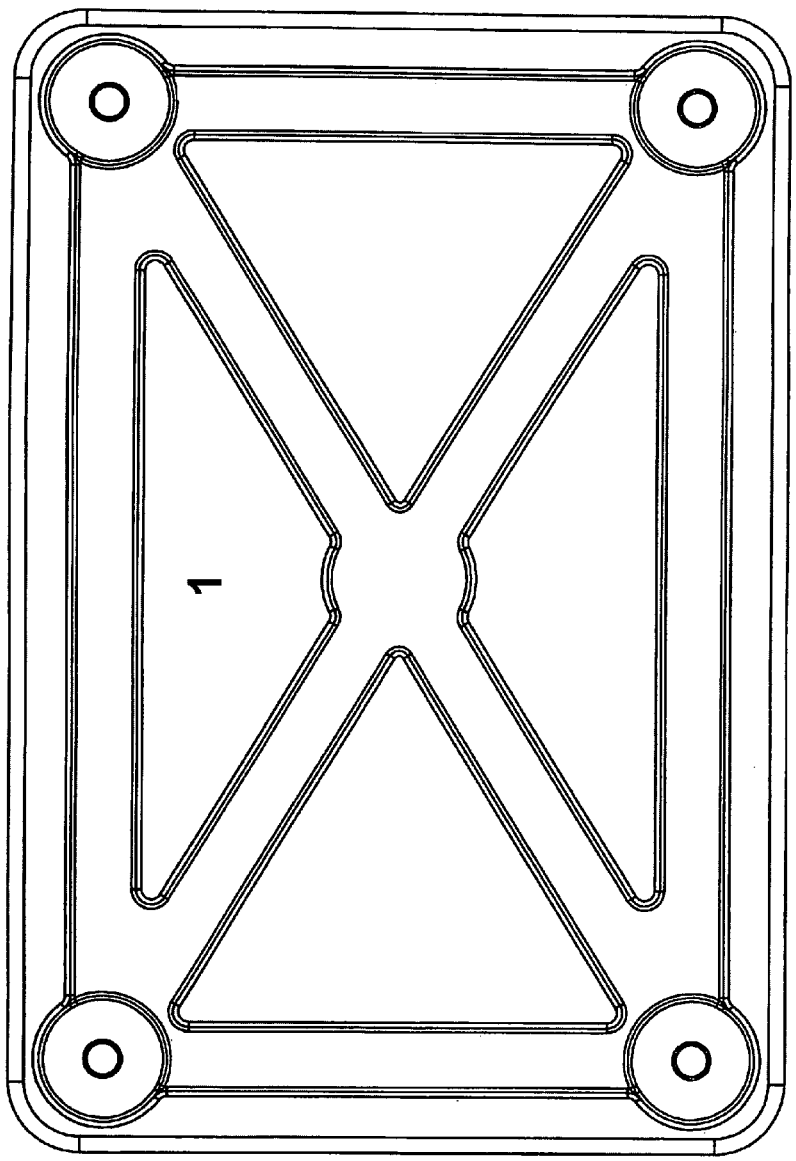
FIG. 5(a-d) shows a top, bottom, and side as well as a front/rear view of the pet cooling station as assembled.
Figure 5D:
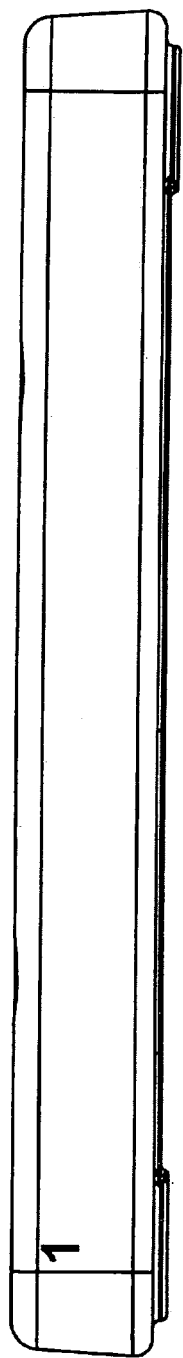

FIG. 5(a-d) illustrates a two-dimensional view of each side of the preferred embodiment of the invention as assembled.

FIG. 5(a) shows a top view of the invention illustrating how the unit is omni-directional. The finger-lift recesses (11) on both the "front" and "rear" of the unit, allow the user to insert, open, and remove the conductive/structural platform tiles (4) from either side of the insulated base (1). FIG. 5(b) shows a bottom view and details the structural design engineered into the molded insulated base (1) aiding in rigidity and overall strength. FIGS. 5(c&d) show a side and a front/rear view of the unit and further illustrates the reinforced underside with integrated raised feet engineered into the molded insulated base (1).

We claim:
1. A pet cooling station comprising:
   an insulated base formed of a moldable material, having insulating compartments surrounded by walls filled with an insulating substance;
   two conductive tiles which is made of a flat conductive material with boxed temperature transfer cases of same or similar conductive material affixed to the underside, opened at the forward edge, granting access to the temperature transfer cases, capable of accepting a cooling substance, through the introduction of cooling pods;
   wherein said tiles fit securely and flush into the insulating compartments of the insulated base.
2. The pet cooling station of claim 1 wherein the insulated base is molded with bi-level tile ridges to support the conductive tiles.
3. The pet cooling station of claim 1 wherein the insulated base is molded with finger recesses to enable the user to easily remove the conductive tiles from the base.

* * * * *

UNITED STATES PATENT AND TRADEMARK OFFICE
CERTIFICATE OF CORRECTION

PATENT NO. : 8,567,347 B2  
APPLICATION NO. : 13/671175  
DATED : October 29, 2013  
INVENTOR(S) : Leahy and Raeside Page 1 of 1

It is certified that error appears in the above-identified patent and that said Letters Patent is hereby corrected as shown below:

Title page should read:

Item (71) Applicants  
Change "Kenneth H." to -- Kenneth M. --

Item (72) Inventors  
Change "Kenneth H." to -- Kenneth M. --

Signed and Sealed this  
Seventeenth Day of December, 2013

Margaret A. Focarino  
*Commissioner for Patents of the United States Patent and Trademark Office*